Nov. 11, 1969
3,477,776
ZOOM WIDE APERTURE LENS
Filed July 1, 1966
2 Sheets-Sheet 1
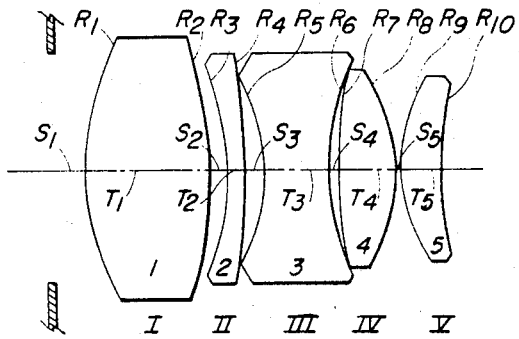
FIG.1
| F=100 | | | | f/1.0 |
|---|---|---|---|---|
| ELEMENT | N | V | R | T & S |
| 1 | $N_1 = 1.75$ | $V_1 = 50.6$ | $R_1 = +118$ | $S_1 = 14.3$ |
|   |   |   | $R_2 = -189$ | $T_1 = 55.5$ |
| 2 | $N_2 = 1.72$ | $V_2 = 29.3$ | $R_3 = -113$ | $S_2 = 7.45$ |
|   |   |   | $R_4 = -323$ | $T_2 = 8.45$ |
| 3 | $N_3 = 1.72$ | $V_3 = 29.3$ | $R_5 = -83.5$ | $S_3 = 8.65$ |
|   |   |   | $R_6 = +116$ | $T_3 = 29.1$ |
| 4 | $N_4 = 1.73$ | $V_4 = 51.0$ | $R_7 = +236$ | $S_4 = 4.57$ |
|   |   |   | $R_8 = -75.9$ | $T_4 = 25.6$ |
| 5 | $N_5 = 1.70$ | $V_5 = 56.2$ | $R_9 = +71.8$ | $S_5 = 1.79$ |
|   |   |   | $R_{10} = +208$ | $T_5 = 18.7$ |
FIG.2
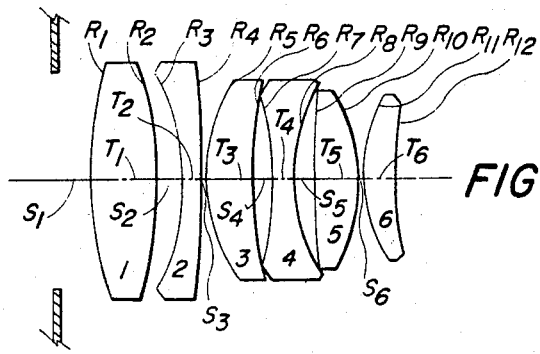
FIG.3
WILLIAM H. PRICE
INVENTOR.
BY Leonard C. Tread Jr.
Robert W Hampton
ATTORNEYS Nov. 11, 1969 W. H. PRICE 3,477,776
ZOOM WIDE APERTURE LENS
Filed July 1, 1966 2 Sheets-Sheet 2

WILLIAM H. PRICE
INVENTOR.

BY *Leonard W. Treash*
*Robert W. Hampton*
ATTORNEYS

United States Patent Office 3,477,776
Patented Nov. 11, 1969

3,477,776
ZOOM WIDE APERTURE LENS
William H. Price, Rochester, N.Y., assignor to Eastman Kodak Company, Rochester, N.Y., a corporation of New Jersey
Filed July 1, 1966, Ser. No. 562,206
Int. Cl. G02b 9/60
U.S. Cl. 350—184                           10 Claims

ABSTRACT OF THE DISCLOSURE

A lens having at least four airspaced components comprising from front to rear a front biconvex positive component, a negative component and two positive components behind the negative component, wherein the adjacent surfaces of the rear two positive components comply with the following inequalities:

$$1 < \frac{L}{R_9} < 1 + N_5$$

$$0.7 < \frac{f_8}{f_9} < 1.2$$

$$0.8F < f_8, f_9 < 1.3F$$

where L is the object distance to a surface from an axial original object, $R_9$ is the radius of curvature of the ninth surface, $N_5$ is the refractive index of the fifth element, $f_n$ is the focal length of the nth surface, and F is the focal length of the lens. In a preferred embodiment a negative meniscus component concave to the front is positioned between, and airspaced from, the front positive component and the negative component.

---

This invention relates to wide aperture lenses. More specifically, this invention relates to lenses suitable for use as motion picture camera lenses at apertures as wide as $f/1.0$.

It has been shown in the prior art that airspaced triplets can be modified to advantage by splitting the positive power in the rear component into two positive components. When used with single element components, aberrations in this modification have been kept within acceptable limits at apertures as wide as $f/1.8$. Prior art attempts to widen the aperture much beyond this point with only single element components have generally resulted in compromises which made the results unsuitable for high quality applications.

In some instances these lenses have given good results at wider apertures when some of the four components have been compounded; see, for example, U.S. 2,536,508, Lotmar where corrections out to $f/1.4$ are claimed for 5 and 6 element designs.

In attempting to raise the aperture of even this compounded type of lens to wider than $f/1.4$, lens designers have generally encountered an unacceptable amount of zonal spherical aberration.

It is an object of this invention to provide a motion picture lens capable of good performance at apertures of $f/1.0$.

It is another object of this invention to provide a 5-element $f/1.0$ motion picture camera lens covering a field of $\pm 14°$ with sharply reduced zonal spherical aberration.

It is another object of this invention to provide a 6-element $f/1.0$ lens with sharply reduced zonal spherical aberration and effectively no distortion out to a field of $\pm 15°$.

It is another object of this invention to provide a feature applicable to a large number of wide aperture lens designs to reduce zonal spherical aberration.

It is another object of this invention to provide a feature which will enable a substantial increase of the aperture of lenses derived from the airspaced triplet type.

It is another object of this invention to provide a relay for a wide aperture zoom lens.

These and other objects are accomplished by a combination of two features. First, a marked widening in tolerable aperture is effected by making the airspace between the two rear positive elements very strongly converging with the rear surface of said airspace slightly weaker than the aplanatic case, thus providing needed spherical aberration over correction while still contributing to the beam convergence. This over-correction allows the front surface of said airspace to have a power of similar magnitude to said rear surface. Second, the zonal spherical aberration is corrected, enabling an opening of the relative aperture to $f/1.0$, by splitting the negative power of the objective by inserting in the airspace between the first two components and airspaced from them a thin negative component which is meniscus concave to the front.

Each of these inventive features reaches its highest degree of usefulness when high index glasses are used and when the first positive and second negative components have substantial thickness.

FIG. 1 is a diagramatic axial cross section of a lens constructed using both inventive features in combination.

FIG. 2 is a chart showing the specifications for construction of a lens according to FIG. 1.

FIG. 3 is a diagrammatic axial cross section of another lens constructed using both inventive features in combination.

Figure 4:
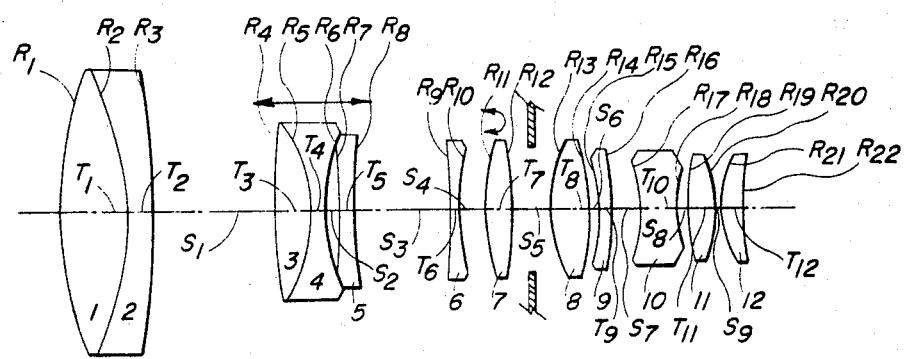
FIG. 4 is a diagrammatic axial cross section of a zoom lens with its relay constructed according to the invention.

For describing and claiming of the invention the lens components are numbered from front to rear with Roman numerals, the lens elements are numbered from front to rear with Arabic numerals, F is the focal length of the lens; the indexes of refraction N for the D line of the spectrum, the dispersive indexes V, the radii of curvature R, the thicknesses T and the separations S are numbered by subscripts from front to rear. The long conjugate side of the lens is considered the front. Radii of curvature having centers of curvature to the rear of the surface are considered positive; those with centers of curvature to the front of the surface are negative. The terms lens and objective shall be used to describe the complete lens and not elements or components thereof.

The design of the rear two positive components is best explained as follows:

An aplanatic surface contributes no spherical aberration to an optical system. It is defined by a unique relationship between the object distance and the radius of curvature, in which $$\frac{L}{R} = \frac{n+n'}{n}$$

where L is the object distance of the surface of the rays from an axial original object, R is the radius of curvature, n is the refractive index of the medium preceding the surface and $n'$ is the index of refraction of the medium following the surface.

At the point where the ray is normal to the surface, that is, where $L=R$, no spherical aberration is also added. In the region in between, that is, where $$1 < \frac{L}{R} < \frac{n+n'}{n}$$

with $n'>n$, the surface increases the beam convergence while contributing over-corrected spherical aberration. See A. E. Conrady, Applied Optics and Optical Design, p. 77, Dover Publications, Inc., 1957.

Applied to the lens shown in FIG. 1, the formula becomes:

$$1 < \frac{L}{R_9} < 1 + N_5$$

The object distance L for the surface ($R_9$) is the axially measured distance between the surface ($R_9$) and the point on the axis to which the rays in question are directed as they strike the surface. The rays in question, of course, are those from the original axial object. In the case of a motion picture camera lens this original object is generally considered to be an infinite object on the axis. Although L may vary slightly from ray to ray due to aberrations in the system at that point, each will still comply with the above inequality if the surface is designed according to the invention.

This addition of over-corrected spherical aberration with substantial convergence allows addition of another strongly converging surface of similar power immediately in front of this surface. The comparative focal lengths of these two surfaces and the overall focal length F of the objective is best expressed by the following relationships:

$$0.8F < f_8, f_9 < 1.3F$$

$$0.7 < \frac{f_8}{f_9} < 1.2$$

where $f_8$ and $f_9$ are the focal lengths of the front and rear surfaces of the airspace between the rear two components.

Although not absolutely essential, corrections are best if the rear surface $R_{10}$ also adds little in terms of spherical aberration, that is if $R_{10} > 0$.

Designing a lens along these lines gives a four component objective with an extremely large amount of converging power in the rear airspace. If an attempt is made to open this lens to $f/1.0$ with components of ordinary width, the zonal spherical aberration becomes intolerable. This, I have found, is due to the contribution to spherical aberration by the negative component. This component is necessarily quite powerful because of the heavy converging power in the two surfaces discussed above. This problem can be overcome by splitting the power of the negaitve component by adding a negative meniscus component concave to the front in the airspace between the front positive component and the negative component.

FIGS. 1 and 2 show a well-corrected lens capable of sharp definition at $f/1.0$. Examples 1, 2, 3 and 4 are specifications for the construction of lenses similar to the lens shown in FIGS. 1 and 2.

Example 1 (FIGS. 1 and 2)

F=100, $f/1.0$

| Element | N | V | R | S or T |
|---|---|---|---|---|
| 1 | $N_1=1.75$ | $V_1=50.6$ | $R_1=+118$ | $S_1=14.3$ |
|   |   |   | $R_2=-189$ | $T_1=55.5$ |
|   |   |   |   | $S_2=7.45$ |
| 2 | $N_2=1.72$ | $V_2=29.3$ | $R_3=-113$ | $T_2=8.45$ |
|   |   |   | $R_4=-323$ | $S_3=8.65$ |
| 3 | $N_3=1.72$ | $V_3=29.3$ | $R_5=-83.5$ | $T_3=29.1$ |
|   |   |   | $R_6=+116$ | $S_4=4.57$ |
| 4 | $N_4=1.73$ | $V_4=51.0$ | $R_7=+236$ | $T_4=25.6$ |
|   |   |   | $R_8=-75.9$ | $S_5=1.79$ |
| 5 | $N_5=1.70$ | $V_5=56.2$ | $R_9=+71.8$ | $T_5=18.7$ |
|   |   |   | $R_{10}=+208$ |   |

Example 2

F=100, $f/1.0$

| Element | N | V | R | S or T |
|---|---|---|---|---|
| 1 | $N_1=1.76$ | $V_1=53.3$ | $R_1=+118$ | $S_1=14.3$ |
|   |   |   | $R_2=-190$ | $T_1=55.4$ |
|   |   |   |   | $S_2=7.4$ |
| 2 | $N_2=1.72$ | $V_2=29.5$ | $R_3=-114$ | $T_2=8.4$ |
|   |   |   | $R_4=-326$ | $S_3=8.6$ |
| 3 | $N_3=1.72$ | $V_3=29.5$ | $R_5=-82.9$ | $T_3=28.8$ |
|   |   |   | $R_6=+116$ | $S_4=4.6$ |
| 4 | $N_4=1.73$ | $V_4=51.0$ | $R_7=+235$ | $T_4=25.6$ |
|   |   |   | $R_8=-75.6$ | $S_5=1.8$ |
| 5 | $N_5=1.70$ | $V_5=55.6$ | $R_9=+71.7$ | $T_5=18.7$ |
|   |   |   | $R_{10}=+208$ |   |

Example 3

F=100, $f/1.0$

| Element | N | V | R | S or T |
|---|---|---|---|---|
| 1 | $N_1=1.77$ | $V_1=49.6$ | $R_1=+121$ | $S_1=14.3$ |
|   |   |   | $R_2=-195$ | $T_1=55.3$ |
|   |   |   |   | $S_2=7.6$ |
| 2 | $N_2=1.72$ | $V_2=29.3$ | $R_3=-114$ | $T_2=8.4$ |
|   |   |   | $R_4=-324$ | $S_3=8.6$ |
| 3 | $N_3=1.72$ | $V_3=29.3$ | $R_5=-83.5$ | $T_3=29.1$ |
|   |   |   | $R_6=+117$ | $S_4=4.6$ |
| 4 | $N_4=1.73$ | $V_4=51.3$ | $R_7=+235$ | $T_4=25.6$ |
|   |   |   | $R_8=-75.7$ | $S_5=1.8$ |
| 5 | $N_5=1.70$ | $V_5=55.6$ | $R_9=+71.7$ | $T_5=18.7$ |
|   |   |   | $R_{10}=+208$ |   |

Example 4

F=100, $f/1.2$

| Element | N | V | R | S or T |
|---|---|---|---|---|
| 1 | $N_1=1.75$ | $V_1=50.6$ | $R_1=+98.9$ | $S_1=14.3$ |
|   |   |   | $R_2=-170$ | $T_1=43.5$ |
|   |   |   |   | $S_2=6.5$ |
| 2 | $N_2=1.72$ | $V_2=29.3$ | $R_3=-104$ | $T_2=7.9$ |
|   |   |   | $R_4=-397$ | $S_3=8.6$ |
| 3 | $N_3=1.72$ | $V_3=29.3$ | $R_5=-78.5$ | $T_3=21.2$ |
|   |   |   | $R_6=+102$ | $S_4=5.6$ |
| 4 | $N_4=1.73$ | $V_4=51.0$ | $R_7=+301$ | $T_4=23.2$ |
|   |   |   | $R_8=-66.1$ | $S_5=1.8$ |
| 5 | $N_5=1.61$ | $V_5=58.8$ | $R_9=+69.6$ | $T_5=18.3$ |
|   |   |   | $R_{10}=+186$ |   |

Examples 1 through 3 are $f/1.0$ lenses, while Example 4 is well corrected only to $f/1.2$. The reason for narrowing the permissible aperture in Example 4 is to substitute a less expensive material for the rear element. It helps demonstrate that the inventive features in these designs are not dependent upon the glass. While the use of high index glasses dramatizes the effect of these inventive features by giving the remarkable results of Examples 1 through 3, the inventive features can still be used with more economical materials to give good corrections at a still very wide aperture.

Example 5 (FIG. 3)

In this example a positive meniscus element was inserted between the negative elements of Example 1 and the resulting lens was corrected. It was found that a wider field (15° half-angle) could be covered with less distortion using this improvement. The inventive features continued to give the results shown in Example 1.

F=100        f/1.0

| Element | N | V | R | S or T |
|---|---|---|---|---|
| 1 | $N_1$=1.75 | $V_1$=50.6 | $R_1$=+192 | $S_1$=15.2 |
|   |   |   | $R_2$=−192 | $T_1$=31.4 |
| 2 | $N_2$=1.72 | $V_2$=29.3 | $R_3$=−109 | $S_2$=12.8 |
|   |   |   | $R_4$=−1,072 | $T_2$=9.1 |
| 3 | $N_3$=1.70 | $V_3$=56.2 | $R_5$=+83.7 | $S_3$=1.8 |
|   |   |   | $R_6$=+211 | $T_3$=22.4 |
| 4 | $N_4$=1.72 | $V_4$=29.3 | $R_7$=−171 | $S_4$=9.6 |
|   |   |   | $R_8$=+85.3 | $T_4$=10.9 |
| 5 | $N_5$=1.73 | $V_5$=51.0 | $R_9$=+1,672 | $S_5$=10.0 |
|   |   |   | $R_{10}$=−75.0 | $T_5$=21.0 |
| 6 | $N_6$=1.73 | $V_6$=51.0 | $R_{11}$=+72.0 | $S_6$=1.5 |
|   |   |   | $R_{12}$=+209 | $T_6$=15.6 |

Example 6 (FIG. 4)

In this example the inventive features were found to work well as the relay for a four component zoom system having a stationary front positive component, a three element zoom second component, a stationary negative third component and a compensating positive fourth component. The zoom second component is composed of a front doublet and a thin negative element slightly airspaced therefrom. The inventive features are responsible for this zoom lens being correctable to f/1.1. In this example the focal length of the relay is 100 mm.

F (element 8-12)=100        f/1.1

| Element | N | V | R | S or T |
|---|---|---|---|---|
| 1 | $N_1$=1.61 | $V_1$=58.8 | $R_1$=+307 | $T_1$=53.9 |
| 2 | $N_2$=1.65 | $V_2$=33.8 | $R_2$=−224 | $T_2$=16.6 |
|   |   |   | $R_3$=−2,367 | $S_1$=154.9-8.4 |
|   |   |   | $R_4$=+889 | $T_3$=29.7 |
| 3 | $N_3$=1.67 | $V_3$=32.0 | $R_5$=−114 | $T_4$=10.0 |
| 4 | $N_4$=1.70 | $V_4$=56.3 | $R_6$=+142 | $S_2$=13.7 |
|   |   |   | $R_7$=−568 | $T_5$=10.0 |
| 5 | $N_5$=1.61 | $V_5$=58.8 | $R_8$=+619 | $S_3$=16.8-163.3 |
|   |   |   | $R_9$=∞ | $T_6$=8.0 |
| 6 | $N_6$=1.65 | $V_6$=33.8 | $R_{10}$=+193 | $S_4$=14.0-19.8 |
|   |   |   | $R_{11}$=+205 | $T_7$=23.7 |
| 7 | $N_7$=1.61 | $V_7$=58.8 | $R_{12}$=−278 | $S_5$=35.7-29.9 |
|   |   |   | $R_{13}$=+104 | $T_8$=31.2 |
| 8 | $N_8$=1.75 | $V_8$=50.6 | $R_{14}$=−179 | $S_6$=7.2 |
|   |   |   | $R_{15}$=−116 | $T_9$=7.5 |
| 9 | $N_9$=1.72 | $V_9$=29.3 | $R_{16}$=−785 | $S_7$=24.2 |
|   |   |   | $R_{17}$=−113 | $T_{10}$=29.2 |
| 10 | $N_{10}$=1.72 | $V_{10}$=29.3 | $R_{18}$=+102 | $S_8$=8.7 |
|   |   |   | $R_{19}$=+330 | $T_{11}$=21.7 |
| 11 | $N_{11}$=1.75 | $V_{11}$=50.6 | $R_{20}$=−84.4 | $S_9$=1.9 |
|   |   |   | $R_{21}$=+75.9 | $T_{12}$=19.9 |
| 12 | $N_{12}$=1.75 | $V_{12}$=50.6 | $R_{22}$=+518 |   |

The lenses illustrated in Examples 7 through 10 are the subject of a co-filed patent application in the name of P. L. Ruben. These examples are included herein to show that the feature embodied in the shape of the rear positive element of Examples 1 through 6 does not need the second feature, the thin negative meniscus element, in order to produce a fairly wide aperture. Secondly, compared to Example 1 with the help of the graphs in FIGS. 5 and 6, Examples 7 through 10 illustrate the remarkable effect on zonal spherical aberration of adding the thin negative meniscus element.

Example 7

F=100        f/1.2

| Element | N | V | R | S or T |
|---|---|---|---|---|
| 1 | $N_1$=1.75 | $V_1$=50.6 | $R_1$=+131 | $S_1$=14.3 |
|   |   |   | $R_2$=−738 | $T_1$=16.4 |
| 2 | $N_2$=1.72 | $V_2$=29.3 | $R_3$=−96.0 | $S_2$=20.7 |
|   |   |   | $R_4$=+94.3 | $T_2$=60.0 |
| 3 | $N_3$=1.75 | $V_3$=50.6 | $R_5$=+117 | $S_3$=2.02 |
|   |   |   | $R_6$=−96.0 | $T_3$=24.3 |
| 4 | $N_4$=1.70 | $V_4$=56.2 | $R_7$=+86.1 | $S_4$=1.43 |
|   |   |   | $R_8$=+154 | $T_4$=34.3 |

Example 8

F=100        f/1.4

| Element | N | V | R | S or T |
|---|---|---|---|---|
| 1 | $N_1$=1.753 | $V_1$=50.6 | $R_1$=+93.8 | $S_1$=14.3 |
|   |   |   | $R_2$=−719 | $T_1$=16.1 |
| 2 | $N_2$=1.720 | $V_2$=29.3 | $R_3$=−79.9 | $S_2$=27.1 |
|   |   |   | $R_4$=+74.3 | $T_2$=29.6 |
| 3 | $N_3$=1.753 | $V_3$=50.6 | $R_5$=+98.7 | $S_3$=3.21 |
|   |   |   | $R_6$=−77.5 | $T_3$=20.0 |
| 4 | $N_4$=1.6968 | $V_4$=56.2 | $R_7$=+89.2 | $S_4$=1.43 |
|   |   |   | $R_8$=+160 | $T_4$=29.3 |

Example 9

F=100        f/1.4

| Element | N | V | R | S or T |
|---|---|---|---|---|
| 1 | $N_1$=1.75 | $V_1$=50.6 | $R_1$=+119.65 | $S_1$=14.29 |
|   |   |   | $R_2$=−2000.3 | $T_1$=14.64 |
| 2 | $N_2$=1.72 | $V_2$=29.3 | $R_3$=−77.093 | $S_2$=22.86 |
|   |   |   | $R_4$=+95.893 | $T_2$=38.21 |
| 3 | $N_3$=1.75 | $V_3$=50.6 | $R_5$=+151.11 | $S_3$=2.57 |
|   |   |   | $R_6$=−74.050 | $T_3$=20.71 |
| 4 | $N_4$=1.70 | $V_4$=56.2 | $R_7$=+81.824 | $S_4$=1.43 |
|   |   |   | $R_8$=+115.92 | $T_4$=35.00 |

Example 10

F=100                                                                    f/1.6

| Element | N | V | R | S or T |
|---|---|---|---|---|
| 1 | $N_1=1.62$ | $V_1=54.9$ | $R_1=+84.8$ | $S_1=14.3$ |
|   |            |            | $R_2=-310$  | $T_1=16.1$ |
| 2 | $N_2=1.69$ | $V_2=30.9$ | $R_3=-58.7$ | $S_2=20.9$ |
|   |            |            | $R_4=+90.3$ | $T_2=26.3$ |
| 3 | $N_3=1.62$ | $V_3=54.9$ | $R_5=+502$  | $S_3=3.93$ |
|   |            |            | $R_6=-50.2$ | $T_3=18.0$ |
| 4 | $N_4=1.62$ | $V_4=54.9$ | $R_7=+69.4$ | $S_4=1.43$ |
|   |            |            | $R_8=+126$  | $T_4=32.5$ |

The following chart shows the respective focal lengths of the surfaces bounding the rear airspace in each of the above examples.

F=100

| Example | Surface | $f_8$ | Surface | $f_9$ |
|---|---|---|---|---|
| 1 | $R_8$ | 103.4 | $R_9$ | 103.0 |
| 2 | $R_8$ | 102.9 | $R_9$ | 102.9 |
| 3 | $R_8$ | 103.1 | $R_9$ | 102.9 |
| 4 | $R_8$ | 90.1 | $R_9$ | 113.9 |
| 5 | $R_{10}$ | 102.2 | $R_{11}$ | 98.1 |
| 6 | $R_{20}$ | 112.1 | $R_{21}$ | 100.8 |
| 7 | $R_6$ | 127.5 | $R_7$ | 123.6 |
| 8 | $R_6$ | 102.9 | $R_7$ | 128.0 |
| 9 | $R_6$ | 99.7 | $R_7$ | 117.4 |
| 10 | $R_6$ | 81.4 | $R_7$ | 112.6 |

Figure 5:
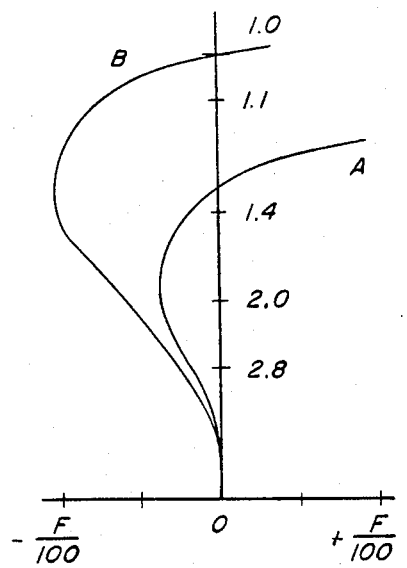
FIG. 5 is a graph of the longitudinal spherical aberration of lenses constructed without one of the inventive features.
Figure 6:
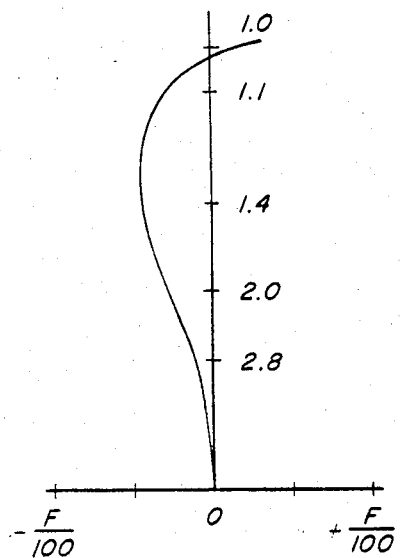
FIG. 6 is a graph of the longitudinal spherical aberration of a lens constructed according to FIGS. 1 and 2.

FIGS. 5 and 6 illustrate the effect on zonal spherical aberration of adding the negative meniscus element. In FIG. 5, line A shows the spherical aberration of a lens made along the lines of Examples 7 through 10. The spherical aberration beyond f/1.2 is intolerable. If the lens is redesigned to bring the marginal rays (at f/1.0) into the acceptable limits the zonal spherical aberration is intolerable. This redesign is illustrated by line B.

FIG. 6 is a graph of the spherical aberration on a lens constructed according to Example 1. Its spherical aberration is acceptable throughout its aperture for high quality work.

Although the remarkable results in Examples 1 through 6 are obtained from the combination of the two inventive features, each of these two inventive features is effective by itself in allowing an increasing of the aperture of an objective. That is, the feature of splitting a bi-concave negative lens in a triplet or modified triplet by adding a negative meniscus element concave to the front in front of the bi-concave element and weakening the bi-concave element's power does not need any particular formation in the rear components to be of some effect in reducing zonal spherical aberration in a high aperture objective.

The following is a description of the form of lens in which the inventive features have the most effect. It applies to a five element objective of the type disclosed in Examples 1 through 4, wherein the various symbols have the same meaning:

The first positive component I is bi-convex and has a thickness in excess of .5F. The negative meniscus component II has a thickness less than .10F. The second negative component III is bi-concave, with a thickness in excess of .20F. The second positive component IV is bi-convex. The third positive component V is positive meniscus convex to the front. All elements are made of high index glass; more specifically:

$$N_1>1.73$$
$$N_2>1.70$$
$$N_3>1.70$$
$$N_4>1.71$$
$$N_5>1.68$$
$$V_2,V_3<32$$
$$50<V_1,V_4,V_5<60$$

These ranges are not intended as limitations on the operability of the inventive features, but are merely the ranges within which they are most effective.

The invention has been described in detail with particular reference to preferred embodiments thereof, but it will be understood that variations and modifications can be effected within the spirit and scope of the invention as described hereinabove.

I claim:

1. In a lens having at least four airspaced components comprising in order from front to rear,
    a first positive component, I,
    a negative component, III,
    a second positive component, IV,
    a third positive component, V,
the combination of improvements wherein
    (A) the second positive component IV and the third positive component V comply with the following inequalities:

$$1<\frac{L}{R_9}<1+N_5$$

$$0.7<\frac{f_8}{f_9}<1.2$$

$$0.9F<f_8, f_9<1.3F$$

where $R_9$ is the radius of curvature of the front surface of the third positive component, F is the focal length of the lens, $N_5$ is the index of refraction for the D line of the spectrum for the third positive component, $f_8$ and $f_9$ are the focal lengths of the rear surface of the second positive component and the front surface of the third positive component respectively, L is the object distance of the front surface of the third positive component, and
    (B) a fifth component II, which is negative, meniscus concave to the front is positioned between and airspaced from said first positive component I and said negative component III.

2. The combination of improvements according to claim 1 wherein
    (C) said negative component III is bi-concave.

3. The combination of improvements according to claim 1 wherein
    (D) each of the five components are single element components and are constructed of transparent materials having characteristics which comply with the following inequalities:

$$N_1>1.73$$
$$N_2,N_3>1.70$$
$$N_4>1.71$$
$$N_5>1.68$$
$$V_2,V_3<32$$
$$50<V_1,V_4,V_5<60$$

where $N_1$ to $N_5$ are the indexes of refraction for the D line of the spectrum and $V_1$ to $V_5$ are the dispersive indexes, and each is numbered by a subscript according to the appropriate element as taken in order from front to rear.

4. The combination of improvements according to claim 1 wherein
    (E) the first positive component I is bi-convex and has a thickness in excess of .5F, (F) the negative meniscus component II has a thickness less than .1F,
(G) the negative component III is bi-concave and has a thickness in excess of .2F,
(H) the second positive component IV is bi-convex,
(I) the third positive component V is meniscus convex to the front.

5. A lens having at least five airspaced components comprising from front to rear
   a bi-convex positive component,
   a negative component meniscus concave to the front,
   a bi-concave negative component,
   a bi-convex positive component,
   a positive component meniscus convex to the front,
said lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F=100      f/1.0

| Element | N | V | R | S or T |
|---|---|---|---|---|
| 1 | $N_1=1.75$ | $V_1=50.6$ | $R_1=+118$ | $S_1=14.3$ |
|   |            |            | $R_2=-189$ | $T_1=55.5$ |
|   |            |            |            | $S_2=7.45$ |
| 2 | $N_2=1.72$ | $V_2=29.3$ | $R_3=-113$ | $T_2=8.45$ |
|   |            |            | $R_4=-323$ | $S_3=8.65$ |
| 3 | $N_3=1.72$ | $V_3=29.3$ | $R_5=-83.5$ | $T_3=29.1$ |
|   |            |            | $R_6=+116$ | $S_4=4.57$ |
| 4 | $N_4=1.73$ | $V_4=51.0$ | $R_7=+236$ | $T_4=25.6$ |
|   |            |            | $R_8=-75.9$ | $S_5=1.79$ |
| 5 | $N_5=1.70$ | $V_5=56.2$ | $R_9=+71.8$ | $T_5=18.7$ |
|   |            |            | $R_{10}=+208$ |         |

6. A lens having at least five airspaced components comprising from front to rear
   a bi-convex positive component,
   a negative component meniscus concave to the front,
   a bi-concave negative component,
   a bi-convex positive component,
   a positive component meniscus convex to the front,
said lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F=100      f/1.0

| Element | N | V | R | S or T |
|---|---|---|---|---|
| 1 | $N_1=1.76$ | $V_1=53.3$ | $R_1=+118$ | $S_1=14.3$ |
|   |            |            | $R_2=-190$ | $T_1=55.4$ |
|   |            |            |            | $S_2=7.4$ |
| 2 | $N_2=1.72$ | $V_2=29.5$ | $R_3=-114$ | $T_2=8.4$ |
|   |            |            | $R_4=-326$ | $S_3=8.6$ |
| 3 | $N_3=1.72$ | $V_3=29.5$ | $R_5=-82.9$ | $T_3=28.8$ |
|   |            |            | $R_6=+116$ | $S_4=4.6$ |
| 4 | $N_4=1.73$ | $V_4=51.0$ | $R_7=+235$ | $T_4=25.6$ |
|   |            |            | $R_8=-75.6$ | $S_5=1.8$ |
| 5 | $N_5=1.70$ | $V_5=55.6$ | $R_9=+71.7$ | $T_5=18.7$ |
|   |            |            | $R_{10}=+208$ |         |

7. A lens having at least five airspaced components comprising from front to rear
   a bi-convex positive component,
   a negative component meniscus concave to the front,
   a bi-concave negative component,
   a bi-convex positive component,
   a positive component meniscus convex to the front,
said lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F=100      f/1.0

| Element | N | V | R | S or T |
|---|---|---|---|---|
| 1 | $N_1=1.77$ | $V_1=49.6$ | $R_1=+121$ | $S_1=14.3$ |
|   |            |            | $R_2=-195$ | $T_1=55.3$ |
|   |            |            |            | $S_2=7.6$ |
| 2 | $N_2=1.72$ | $V_2=29.3$ | $R_3=-114$ | $T_2=8.4$ |
|   |            |            | $R_4=-324$ | $S_3=8.6$ |
| 3 | $N_3=1.72$ | $V_3=29.3$ | $R_5=-83.5$ | $T_3=29.1$ |
|   |            |            | $R_6=+117$ | $S_4=4.6$ |
| 4 | $N_4=1.73$ | $V_4=51.3$ | $R_7=+235$ | $T_4=25.6$ |
|   |            |            | $R_8=-75.7$ | $S_5=1.8$ |
| 5 | $N_5=1.70$ | $V_5=55.6$ | $R_9=+71.7$ | $T_5=18.7$ |
|   |            |            | $R_{10}=+208$ |         |

8. A lens having at least five airspaced components comprising from front to rear
   a bi-convex positive component,
   a negative component meniscus concave to the front,
   a bi-concave negative component,
   a bi-convex positive component,
   a positive component meniscus convex to the front,
said lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F=100      f/1.2

| Element | N | V | R | S or T |
|---|---|---|---|---|
| 1 | $N_1=1.75$ | $V_1=50.6$ | $R_1=+98.9$ | $S_1=14.3$ |
|   |            |            | $R_2=-170$ | $T_1=43.5$ |
|   |            |            |            | $S_2=6.5$ |
| 2 | $N_2=1.72$ | $V_2=29.3$ | $R_3=-104$ | $T_2=7.9$ |
|   |            |            | $R_4=-397$ | $S_3=8.6$ |
| 3 | $N_3=1.72$ | $V_3=29.3$ | $R_5=-78.5$ | $T_3=21.2$ |
|   |            |            | $R_6=+102$ | $S_4=5.6$ |
| 4 | $N_4=1.73$ | $V_4=51.0$ | $R_7=+301$ | $T_4=23.2$ |
|   |            |            | $R_8=-66.1$ | $S_5=1.8$ |
| 5 | $N_5=1.61$ | $V_5=58.8$ | $R_9=+69.6$ | $T_5=18.3$ |
|   |            |            | $R_{10}=+186$ |         |

9. A lens having at least five airspaced components comprising from front to rear
a bi-convex positive component,
a negative component meniscus concave to the front,
a bi-concave negative component,
a bi-convex positive component,
a positive component meniscus convex to the front, said lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F=100            f/1.0

| Element | N | V | R | S or T |
|---|---|---|---|---|
| 1 | $N_1=1.75$ | $V_1=50.6$ | $R_1=+192$ | $S_1=15.2$ |
|   |            |            | $R_2=-192$ | $T_1=31.4$ |
|   |            |            |            | $S_2=12.8$ |
| 2 | $N_2=1.72$ | $V_2=29.3$ | $R_3=-109$ | $T_2=9.1$ |
|   |            |            | $R_4=-1,072$ | $S_3=1.8$ |
| 3 | $N_3=1.70$ | $V_3=56.2$ | $R_5=+83.7$ | $T_3=22.4$ |
|   |            |            | $R_6=+211$ | $S_4=9.6$ |
| 4 | $N_4=1.72$ | $V_4=29.3$ | $R_7=-171$ | $T_4=10.9$ |
|   |            |            | $R_8=+85.3$ | $S_5=10.0$ |
| 5 | $N_5=1.73$ | $V_5=51.0$ | $R_9=+1,672$ | $T_5=21.0$ |
|   |            |            | $R_{10}=-75.0$ | $S_6=1.5$ |
| 6 | $N_6=1.73$ | $V_6=51.0$ | $R_{11}=+72.0$ | $T_6=15.6$ |
|   |            |            | $R_{12}=+209$ |  |

10. A zoom lens comprising a front zoom portion having a front fixed component, a middle negative component movable to change magnification and a rear positive component movable to maintain a constant back focus and a rear relay portion having a front positive component and two rear positive components separated by two negative components, the front most of said negative components being meniscus concave to the front and the rearmost of said negative components being biconcave, said zoom lens being constructed substantially according to the following chart, where the lens elements are numbered from front to rear, F is the focal length of the lens, the indexes of refraction N for the D line of the spectrum, the dispersive indexes V, the radii of curvature R, the thicknesses T, and the separations S are numbered by subscripts from front to rear:

F (element 8–12) =100      f/1.1

| Element | N | V | R | S or T |
|---|---|---|---|---|
| 1 | $N_1=1.61$ | $V_1=58.8$ | $R_1=+307$ | $T_1=53.9$ |
|   |            |            | $R_2=-224$ |            |
| 2 | $N_2=1.65$ | $V_2=33.8$ |            | $T_2=16.6$ |
|   |            |            | $R_3=-2,367$ | $S_1=154.9-8.4$ |
|   |            |            | $R_4=+889$ |            |
| 3 | $N_3=1.67$ | $V_3=32.0$ |            | $T_3=29.7$ |
|   |            |            | $R_5=-114$ |            |
| 4 | $N_4=1.70$ | $V_4=56.2$ |            | $T_4=10.0$ |
|   |            |            | $R_6=+142$ |            |
|   |            |            |            | $S_2=13.7$ |
|   |            |            | $R_7=-568$ |            |
| 5 | $N_5=1.61$ | $V_5=58.8$ |            | $T_5=10.0$ |
|   |            |            | $R_8=+619$ |            |
|   |            |            |            | $S_3=16.8-163.3$ |
|   |            |            | $R_9=\infty$ |            |
| 6 | $N_6=1.65$ | $V_6=33.8$ |            | $T_6=8.0$ |
|   |            |            | $R_{10}=+193$ |          |
|   |            |            |            | $S_4=14.0-19.8$ |
|   |            |            | $R_{11}=+205$ |          |
| 7 | $N_7=1.61$ | $V_7=58.8$ |            | $T_7=23.7$ |
|   |            |            | $R_{12}=-278$ |          |
|   |            |            |            | $S_5=35.7-29.9$ |
|   |            |            | $R_{13}=+104$ |          |
| 8 | $N_8=1.75$ | $V_8=50.6$ |            | $T_8=31.2$ |
|   |            |            | $R_{14}=-179$ |          |
|   |            |            |            | $S_6=7.2$ |
|   |            |            | $R_{15}=-116$ |          |
| 9 | $N_9=1.72$ | $V_9=29.3$ |            | $T_9=7.5$ |
|   |            |            | $R_{16}=-785$ |          |
|   |            |            |            | $S_7=24.2$ |
|   |            |            | $R_{17}=-113$ |          |
| 10 | $N_{10}=1.72$ | $V_{10}=29.3$ |       | $T_{10}=29.2$ |
|   |            |            | $R_{18}=+102$ |          |
|   |            |            |            | $S_8=8.7$ |
|   |            |            | $R_{19}=+330$ |          |
| 11 | $N_{11}=1.75$ | $V_{11}=50.6$ |       | $T_{11}=21.7$ |
|   |            |            | $R_{20}=-84.4$ |          |
|   |            |            |            | $S_9=1.9$ |
|   |            |            | $R_{21}=+75.9$ |          |
| 12 | $N_{12}=1.75$ | $V_{12}=50.6$ |       | $T_{12}=19.9$ |
|   |            |            | $R_{22}=+518$ |          |

References Cited

UNITED STATES PATENTS

| | | | |
|---|---|---|---|
| 1,540,752 | 6/1925 | Bielicke | 350—209 |
| 1,934,561 | 11/1933 | Rayton | 320—216 |
| 2,536,508 | 1/1951 | Lotmar | 350—220 |
| 2,718,817 | 9/1955 | Back et al. | 350—184 |
| 3,000,259 | 9/1961 | Turula et al. | 350—186 |
| 3,307,898 | 3/1967 | Hudson | 350—184 |
| 3,011,401 | 12/1961 | Sandback | 350—208 |
| 3,011,402 | 12/1961 | Johnson | 350—206 |
| 3,029,700 | 4/1962 | Price | 350—184 |

FOREIGN PATENTS

3,811,593    7/1963    Japan.

OTHER REFERENCES

Conrady, Applied Optics, 1957, Dover Publications Inc., N.Y., pp. 72–80.

DAVID SCHONBERG, Primary Examiner

P. R. GILLIAM, Assistant Examiner

U.S. Cl. X.R.

350—217